(12) United States Patent
Barham et al.

(10) Patent No.: US 9,722,780 B2
(45) Date of Patent: Aug. 1, 2017

(54) COMPLEX FORMAT-PRESERVING TOKENIZATION SCHEME

(71) Applicant: International Business Machines Corporation, Armonk, NY (US)

(72) Inventors: Muhammad Barham, Haifa (IL); Ariel Farkash, Shimshit (IL); Boris Rozenberg, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 14/839,983

(22) Filed: Aug. 30, 2015

(65) Prior Publication Data

US 2017/0063533 A1 Mar. 2, 2017

(51) Int. Cl.
*H04K 1/00* (2006.01)
*H04L 9/06* (2006.01)

(52) U.S. Cl.
CPC .................................. *H04L 9/0643* (2013.01)

(58) Field of Classification Search
CPC ...................................................... H04L 9/0643
USPC ......................................................... 380/28
See application file for complete search history.

(56) References Cited

U.S. PATENT DOCUMENTS

| | | | |
|---|---|---|---|
| 8,208,627 B2 | 6/2012 | Pauker et al. | |
| 8,595,850 B2 | 11/2013 | Spies et al. | |
| 8,688,524 B1* | 4/2014 | Ramalingam | G06Q 20/20 705/16 |
| 8,855,296 B2 | 10/2014 | Pauker et al. | |
| 8,978,152 B1 | 3/2015 | Rozenberg et al. | |
| 2011/0103579 A1 | 5/2011 | Martin et al. | |
| 2011/0280394 A1 | 11/2011 | Hoover | |
| 2014/0075568 A1 | 3/2014 | Sathyadevan et al. | |
| 2014/0090081 A1* | 3/2014 | Mattsson | G06F 21/6218 726/27 |
| 2015/0095252 A1* | 4/2015 | Mattsson | H04L 9/06 705/325 |
| 2015/0096039 A1* | 4/2015 | Mattsson | G06F 21/6254 726/26 |
| 2016/0034442 A1* | 2/2016 | Levy | H04L 67/10 709/203 |
| 2016/0070917 A1* | 3/2016 | Rozenberg | H04L 63/0414 726/26 |

* cited by examiner

*Primary Examiner* — Mohammad W Reza
(74) *Attorney, Agent, or Firm* — Daniel Kligler

(57) ABSTRACT

Methods, computing systems and computer program products implement embodiments of the present invention that include defining multiple primitives, each of the primitives including ranking and unranking methods. Two or more of the multiple primitives are selected, and an operation is performed on the selected primitives, thereby defining a complex format. Upon an encryption processor receiving a data record including a plaintext, the complex format is applied to the plaintext, thereby generating a non-reversible token. In some embodiments, the generated token is transmitted a remote computer.

20 Claims, 2 Drawing Sheets

COMPLEX FORMAT-PRESERVING TOKENIZATION SCHEME

FIELD OF THE INVENTION

The present invention relates generally to tokenization, and specifically to defining complex tokenization schemes for tokenizing plaintext.

BACKGROUND

Encryption and tokenization are two methods used to protect data stored in data centers. In encryption, a cryptographic algorithm renders data unreadable unless a user possesses the appropriate cryptographic 'keys' to decrypt the data. The cryptographic keys must be treated with the same care as the data, since a compromise of the keys will result in a compromise of the encrypted data. It is simply a case of switching protection from the data, in instances where it is unencrypted, to the cryptographic keys in instances where the data is encrypted. While on the surface it seems to be a practical approach, encryption keys are still vulnerable to exposure, which can be very dangerous, particularly in large enterprise environments.

As opposed to using breakable encryption algorithms to secure sensitive data, tokenization systems replace the sensitive data with 1-to-1-mapped random data that comprises a token. Since the original data is not contained within the token, the token typically cannot be reversed into the original data.

Tokenization of sensitive data is typically more secure than encryption since the original sensitive data and the token typically are not stored on a single system at any given time. Additionally, since tokens cannot be reversed independently of the secure platform or software by breaking an algorithm, tokenized data is extremely difficult to be reverse-engineered back into the original data.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY

There is provided, in accordance with an embodiment of the present invention a method, including defining multiple primitives, each of the primitives including ranking and unranking methods, selecting two or more of the multiple primitives, performing an operation on the selected primitives, thereby defining a complex format, receiving a data record including a plaintext, and applying, by a hashing processor, the complex format to the plaintext, thereby generating a non-reversible token.

There is also provided, in accordance with an embodiment of the present invention a computing system, including a memory, and a hashing processor configured to define multiple primitives, each of the primitives including ranking and unranking methods, to select two or more of the multiple primitives, to perform an operation on the selected primitives, thereby defining a complex format, to receive a data record v a plaintext, and to apply the complex format to the plaintext, thereby generating a non-reversible token.

There is further provided, in accordance with an embodiment of the present invention a computer program product, the computer program product including a non-transitory computer readable storage medium having computer readable program code embodied therewith, the computer readable program code including computer readable program code configured to define multiple primitives, each of the primitive including ranking and unranking methods, computer readable program code configured to select two or more of the multiple primitives, computer readable program code configured to perform an operation on the selected primitives, thereby defining a complex format, computer readable program code configured to receive a data record including a plaintext, and computer readable program code configured to apply the complex format to the plaintext, thereby generating a non-reversible token.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

U.S. patent application Ser. No. 14/296,484, filed on Jun. 5, 2014, whose disclosure is incorporated herein by reference, describes identifying several simple formats (also referred to herein as primitives) and composition operations which can be used to create complex formats that can be used to encrypt plaintext into ciphertext. The operations include enabling a definition of general formats, by defining format building-blocks and composition operations.

The strategy of representing formats by simpler building blocks has an added advantage that explicit ranking and unranking methods can be designed for any format defined by the framework. Thus, there is no need to "simplify" formats. In operation, each format can be directly mapped to a numerical domain, and therefore cycle-walking can be completely eliminated. This improves the efficiency of the scheme without compromising its security.

Embodiments of the present invention provide methods and systems for using the complex formats described in the patent application cited above to generate of cryptographic tokens. As described hereinbelow, a computer system comprising a hashing processor is initialized by defining multiple primitives, and the primitives are then used to define one or more complex formats. In embodiments of the present invention, each of the primitives comprises a ranking method and an unranking method, and each of the complex formats is defined by selecting two or more of the multiple primitives, and performing an operation on the selected primitives.

Upon receiving a data record comprising a plaintext, the hashing processor applies the complex format to the plaintext, thereby generating a non-reversible token. Therefore, systems implementing embodiments of the present invention can support transactions (e.g., card transactions, web application request/response interaction, REST based protocols) without disclosing sensitive information.

System Description

Figure 1:
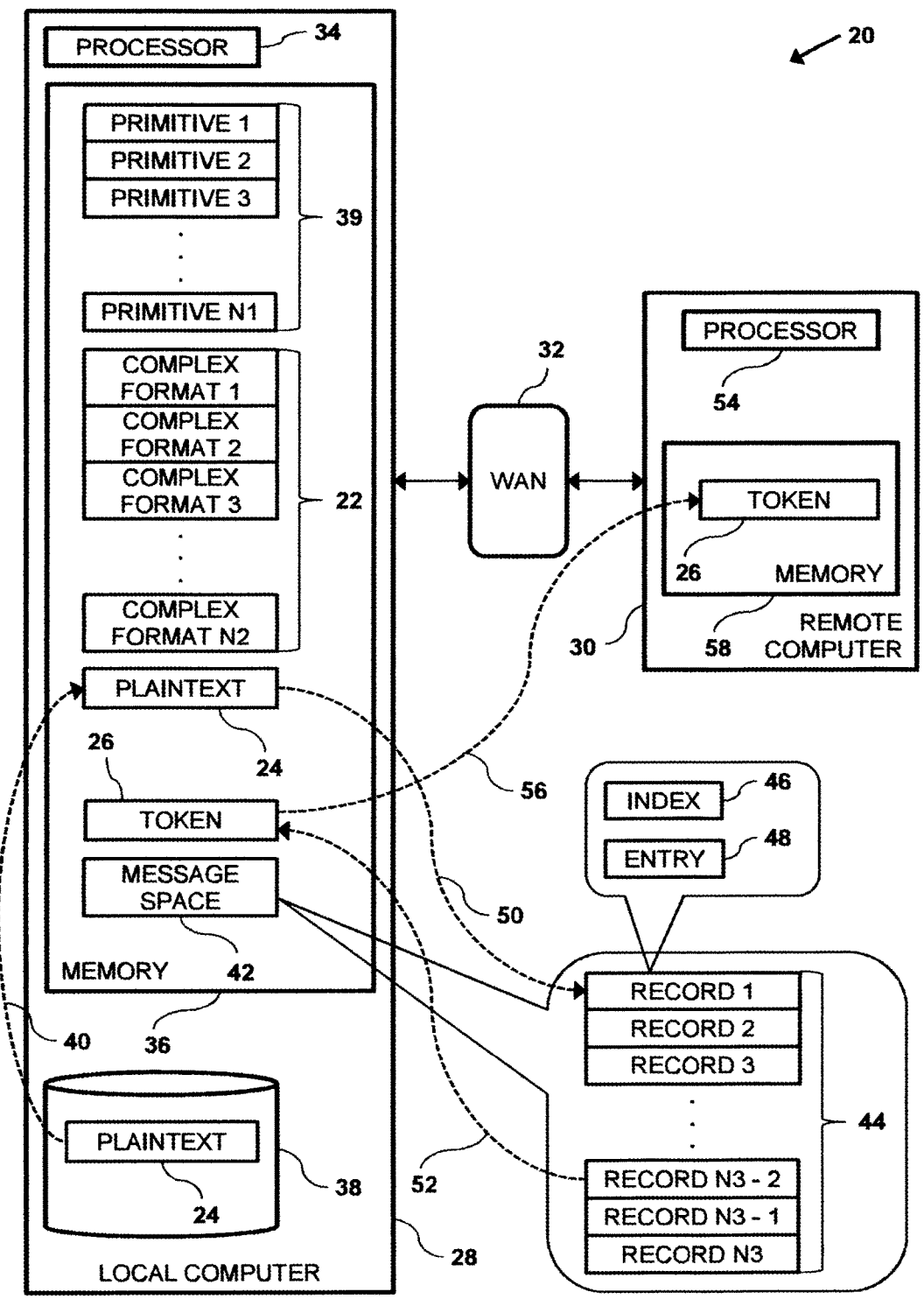
FIG. 1 is a block diagram that schematically illustrates a computer system configured to use complex format tokenization schemes, in accordance with an embodiment of the present invention.

FIG. 1 is a block diagram that schematically illustrates a facility 20 that uses complex formats 22 for tokenizing a plaintext 24 into a token 26, in accordance with an embodiment of the invention. In the configuration shown in FIG. 1, facility 20 comprises a local computer 28 in communication with a remote computer 30 via a wide area network (WAN) 32.

Local computer 28 comprises a hashing processor 34, a local memory 36 and a storage device 38. As described hereinbelow, memory 36 initially stores primitives 39, and processor 34 is configured to create complex formats 22 from the multiple primitives, to receive plaintext 24, and to tokenize (i.e., create token 26) the plaintext using a given complex format 22. In the configuration shown in FIG. 1, processor 34 receives plaintext 24 by retrieving the plaintext from storage device 38, as indicated by an arrow 40. Additionally, as explained hereinbelow, if processor 34 has already created one or more complex formats 22, the hashing processor can create an additional complex format 22 from a combination of one or more of the previously defined complex formats and/or one or more primitives 39.

While the example in FIG. 1 shows processor 34 retrieving plaintext 24 from storage device 38, the hashing processor receiving the plaintext from a different device is considered to be within the spirit and scope of the present invention. In some embodiments, processor 34 can receive plaintext 24 from a user via an input device such as a keyboard (not shown). In an alternative embodiment, processor 34 can receive plaintext 24 from an additional computer (not shown) via a network connection such as WAN 32.

Memory 36 stores a message space 42 (also referred to herein as message space M or simply AO comprising multiple records 44, which are used for ranking during tokenization. Each record comprises a respective index 46 and a corresponding entry 48. Each index 46 typically comprises an integer value, and each entry 48 comprises a sequence of bytes (e.g., an alphanumeric string) that is mapped to its corresponding index 46.

In a manner similar to using a given complex format 22 to encrypt plaintext 24 into a ciphertext (not shown) as described in detail in the patent application cited above, hashing processor 34 is configured to use a given complex format 22 to tokenize the plaintext into token 26. To tokenize plaintext 24 into token 26, processor 34 uses the given complex format to map the plaintext to a first given entry 48 in a first given record 44 having a first given index 46, applies a hashing algorithm to tokenize (i.e., calculate) a value indicating a second given index 46, and retrieves, from message space 42, the corresponding entry for the given second index. In the example shown in FIG. 1, the mapping of plaintext 24 to the first given entry is indicated by an arrow 50, and the calculated value indicated the given second index having a corresponding entry 48 comprising token 26 is indicated by an arrow 52.

Remote computer 30 comprises a remote processor 54 that is configured to receive token 26 from computer, as indicated by an arrow 56, and to store the received token to a remote memory 58. Since remote computer 30 does not store the mapping information stored in message space 42 in memory 36, token 26 can be considered to be "nonreversible".

Processors 34 and 54 typically comprise a general-purpose computer, which are programmed in software to carry out the functions described herein. The software may be downloaded to systems computers 28 and 30 in electronic form, over a network, for example, or it may be provided on non-transitory tangible media, such as optical, magnetic or electronic memory media. Alternatively, some or all of the functions of processors 34 and 54 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Complex Format Tokenization

Figure 2:
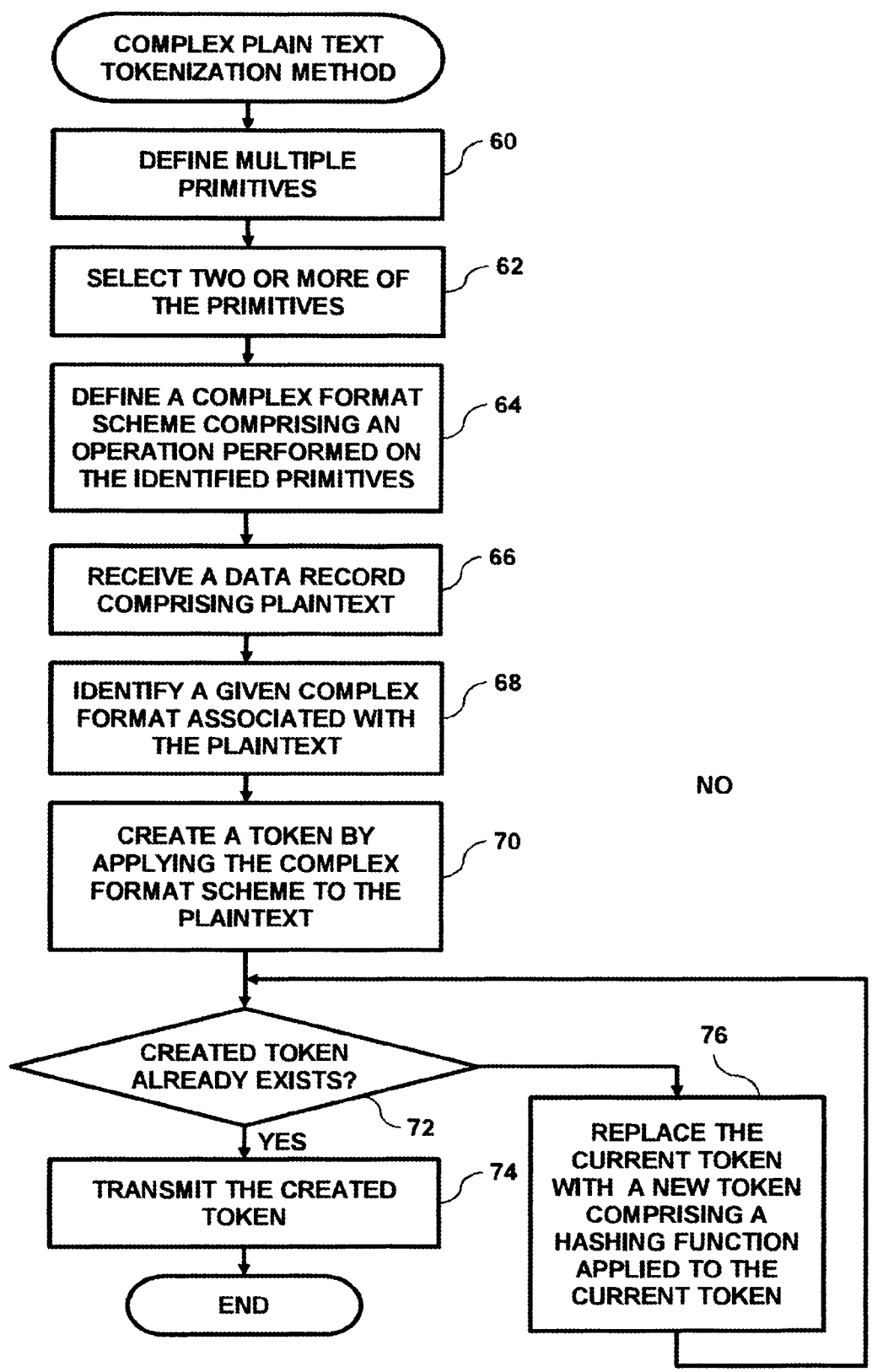
FIG. 2 is a flow diagram that schematically illustrates a method of using a given complex tokenization scheme to tokenize plaintext, in accordance with an embodiment of the present invention.

FIG. 2 is a flow diagram that schematically illustrates a method for complex format tokenization, in accordance with an embodiment of the present invention. In an initialization step 60, processor 34 defines multiple primitives 39, and stores the primitives to memory 36. Each primitive 39 typically comprises format tokenization ranking and unranking methods representing a "rigid" format that can be used to design efficient general-format ranking and unranking algorithms. The format tokenization ranking and unranking methods operate in a similar manner to the format preserving encryption described in detail in the patent application cited above.

Additionally, as described hereinbelow, primitives 39 can be used as "building blocks" to create one or more complex formats 22. Each primitive 39 (e.g., a social security number) typically requires specially-tailored ranking and unranking methods. Primitive types include, but are not limited to:

Social Security Numbers (SSN). A valid SSN consists of a nine digit decimal string with specific restrictions.

Credit card numbers (CCN). A valid CCN consists of a 16 digit decimal string with a valid luhn sum-check digit as the 16th digit.

Dates. Dates can have various formats (e.g., MM/DD/YY and DD/MM/YYY). Additionally a date FPE can specify a range of valid dates (i.e., between a start and an end date).

Numerical domains. Numerical domains comprise integral numbers between a minimum and a maximum value.

Text strings having a fixed length 1, with location-specific character-sets, so that every index is defined by a set of "legal" characters.

Strings of variable lengths (each length between a minimum and a maximum value) and comprising a set of "legal" characters.

In a select step 62, processor 34 selects two or more primitives 39, and in a definition step 64, the hashing processor performs an operation on the selected primitives in order to defining a given "non-rigid" complex format 22. Processor 34 can create the given complex format 22 in a manner similar to how the complex formats are created in the patent application cited above. Additionally, embodiments of the present invention can use methods for large format preserving encryption described in the patent application cited above to perform large format tokenization of plaintext 24.

In some embodiments, performing the operation on the selected primitives comprises concatenating the selected primitives. In additional embodiments, performing the operation on the selected primitives comprises generating a union of the selected primitives. In further embodiments, the operation may comprise a combination of concatenation and union. More generally, any combination of these operations is possible.

In supplemental embodiments, processor 34 can repeat steps 62 and 64 in order to define multiple complex formats 22. Upon processor 34 defining the multiple complex formats, the hashing processor can create an additional complex format using one or more previously defined complex formats 22. In a first supplemental embodiment, processor 34 can create the additional complex format by performing the operation (i.e., concatenation and/or union) on a plurality of the multiple complex formats. In a second supplemental embodiment, processor 34 can create the additional complex format by performing the operation (i.e., concatenation and/or union) on one or more of the multiple complex formats 22 and one or more primitives 39.

General examples of a concatenation operation performed on one or more primitives 39 and/or one or more complex formats 22 include, but are not limited to:

Strings $s=s_1 \ldots s_n$, where $s_1, \ldots, s_n$ have primitive format-types $P_1, \ldots, P_n$, or have format-types $F_1, \ldots, F_n$ (either primitives 39 or complex formats 22) defined over disjoint alphabets. By adding delimiter-characters between the substrings $s_1, \ldots s_n$, the disjointedness requirement can be eliminated. This concatenation is referred to herein as a type-"a" concatenation.

Strings $s=s_1 d s_2 d \ldots d s_n$, where min<=n<=max for some min and max values, all substrings have the format defined by some field F', and d is a delimiter character not contained in the alphabet of F'. This concatenation is referred to herein as a type-"b" concatenation.

In a specific example of concatenation, the complex format "date,SSN,CCN" described hereinabove can be obtained by the comma-delimited concatenation of the primitives date, SSN and CCN. Similarly, the complex format "name str strNum city zip country" can be constructed as the space-delimited concatenation of the formats X, Z, Y, W, Y, defined as follows. Let U be a concatenation of the two primitives T and V, where T contains upper-case letters (i.e., length-1 strings) and V contains lower-case letter strings of length 1-62. Then, X is a space-delimited concatenation of 2-8 substrings with the format U, Z is a numerical domain defined by a minimal value 1 and a maximal value 1053, Y is a space-delimited concatenation of 1-4 substrings with the format U, and W consists of 7-digit strings.

Unions of primitives 39, where the complex format F can be expressed as $F=\text{UNION}(F1, \ldots, Fn)$, wherein F includes all strings s such that s has the format $F_i$ for some 1<=i<=n.

A specific example of a union operation comprises a street number complex format 22. For example, a valid street number can be of the form "M/N" where, e.g., 1<=M<=3000 and 1<=N<=99, or of the form "M" where, e.g., M<=3500. The complex format can then be defined as UNION ($F_1, F_2$) where $F_1$ is of the form M/N (representing an apartment in an apartment building), and $F_2$ is the format M (representing a private house).

Returning to the flow diagram, in a receive step 66, processor 34 receives a data record comprising plaintext 24. As described supra, processor 34 can receive plaintext 24 by retrieving the plaintext from storage device 38, by receiving the plaintext from a user input device such as a keyboard (not shown), or receive the plaintext from a communications port (not shown).

In an identification step 68, processor 34 identifies a given complex format 22 associated with the received plaintext, and in an tokenization step 70, the hashing processor applies the given complex format to plaintext 24, in order to generate token 26 from the plaintext. To generate token 26, processor 34 can perform the following steps:

Initialize message space 42 with multiple entries 48 which are used for ranking and unranking while generating the token. As described supra, each of the entries in message space 42 has a corresponding index 46.

Map, using the identified complex format 22, plaintext 24 (also referred to herein as a message m) to a numeric value that comprises a given index 46 in message space 42. In some embodiments processor 34 can define a mapping from a message space M to $\{1, 2, \ldots |M|\}$, where the i'th message in M is mapped to the number i. Consequently, the message m is mapped to its index $i_m$ in M. This mapping comprises a "ranking" of m.

Tokenize the number $i_m$ into a number j, by applying a hashing algorithm of an integer format tokenization scheme that maps the set $\{1, 2, \ldots |M|\}$ onto itself. In other words, processor 34 tokenizes a first number $i_m$ (also referred to herein as a first index 46) into a second number j (also referred to herein as a second index 46), wherein $i_m$ and j are in the same domain M.

The j'th message m' in M is the tokenization of m. (The process of finding m' given its index in M is called "unranking"). In other words, the input for the unranking process comprises a number (j), and the output (i.e., the result of the tokenization) comprises a message in M that is obtained by retrieving, from message space 42, a given entry 48 corresponding to the second given index.

Returning to the flow diagram, in a comparison step 72, if token 26 does not match any entries 48 in message space 42, then processor 34 transmits token 26 to remote computer 30 in a transmission step 74, and the method ends. Returning to step 72, if token 26 matches a given entry 48 in message space 42, then in a cycle walking step 76, processor 34 applies a hashing function to the token, stores the result of the hashing function to the token (i.e., the hashing processor replaces the current token with a new token comprising a hashing function applied to the current token), and the method continues with step 72. Comparison step 72 and cycle walking step 76 ensure that each received plaintext 24 is mapped to a unique token 26.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
managing, in a memory, a list of format definitions, including multiple primitive formats, each format definition being associated with a respective ranking function and a respective unranking function;
receiving, by a computer associated with the memory, indications defining a complex format, the indications including two or more of the format definitions in the managed list, and one or more combining operations to be applied to the indicated two or more different format definitions to generate a complex format;
generating, by the computer, a ranking function and an unranking function for the indications of the complex format, responsive to the received indications and the respective ranking and unranking functions of the indicated format definitions;
receiving a data record comprising a plaintext;
applying, by a hashing processor, the ranking function of the complex format to the plaintext;
hashing a result of applying the ranking function of the complex format to the plaintext; and
applying the unranking function of the complex format to the hashing of the result, thereby generating a non-reversible token.

2. The method according to claim 1, and comprising transmitting the token to a remote computer.

3. The method according to claim 1, wherein the one or more combining operations are selected from a list consisting of concatenating indicated format definitions and generating a union of indicated format definitions.

4. The method according to claim 1, and comprising storing, in the memory, a format definition of the complex format, and the ranking and unranking functions of the complex format.

5. The method according to claim 4, and comprising receiving indications defining a complex format formed of one or more of the multiple primitives and one or more of the complex formats having a record stored in the memory and defining an additional complex format based on a combination of the one or more of the multiple primitives and the one or more complex formats having a record stored in the memory.

6. The method according to claim 1, wherein generating the token comprises initializing a message space with multiple entries, each entry having a corresponding index, mapping, using the complex format, the plaintext to a first given index, applying a hashing algorithm to tokenize the first given index to a second given index, and retrieving, from the message space, a given entry having the second given index.

7. The method according to claim 6, wherein the plaintext comprises a first plaintext, and wherein the given entry comprises a first given entry, and comprising subsequent to tokenizing the first given index to the second given index, mapping a second plaintext to a third given index, and upon applying the hashing algorithm in order to tokenize the third given index to the second index, applying the hashing algorithm to the second given index in order to tokenize the second given index to a fourth given index, and retrieving, from the message space, a second given entry having the fourth given index.

8. A computing system, comprising:
a memory; and
a hashing processor configured:
to manage, in the memory, a list of format definitions, including multiple primitive formats, each format definition being associated with a respective a respective ranking and unranking,
to receive indications defining a complex format, the indications including two or more of the format definitions in the managed list, and one or more combining operations to be applied to the indicated two or more different format definitions to generate a complex format,
to generate a ranking function and an unranking function for the indications of the complex format, responsive to the received indications and the respective ranking and unranking functions of the indicated format definitions,
to receive a data record comprising a plaintext,
to apply the ranking function of the complex format to the plaintext,
to hash a result of applying the ranking function of the complex format to the plaintext; and
to apply the unranking function of the complex format to the hashing of the result, thereby generating a non-reversible token.

9. The computing system according to claim 8, wherein the hashing processor is configured to transmit the token to a remote computer.

10. The computing system according to claim 8, wherein the one or more combining operations are selected from a list consisting of concatenating indicated format definitions and generating a union of indicated format definitions.

11. The computing system according to claim 8, wherein the hashing processor is configured to store, in the memory, a format definition of the complex format, and the ranking and unranking functions of the complex format.

12. The computing system according to claim 11, wherein the hashing processor is configured to receive indications defining a complex format formed of one or more of the multiple primitives and one or more of the complex formats having a record stored in the memory and to define an additional complex format based on a combination of the one or more of the multiple primitives and the one or more complex formats having a record stored in the memory.

13. The computing system according to claim 8, wherein the hashing processor is configured to repeat the steps of selecting and performing, thereby defining multiple complex formats, and wherein the hashing processor is configured to perform the operation on one or more of the multiple primitives and one or more of the multiple complex formats, thereby defining an additional complex format.

14. The computing system according to claim 13, wherein the hashing processor is configured to generate the token by initializing a message space with multiple entries, each entry having a corresponding index, to map, using the complex format, the plaintext to a first given index, to apply a hashing algorithm to tokenize the first given index to a second given index, and to retrieve, from the message space, a given entry having the second given index.

15. A computer program product, the computer program product comprising:
a non-transitory computer readable storage medium having computer readable program code embodied therewith, the computer readable program code comprising:
computer readable program code configured to manage, in a memory, a list of format definitions, including multiple primitive formats, each format definition being associated with a respective ranking function and a respective unranking function;

computer readable program code configured to receive, by a computer associated with the memory, indications defining a complex format, the indications including two or more of the format definitions in the managed list, and one or more combining operations to be applied to the indicated two or more different format definitions to generate a complex format;

computer readable program code configured to receive a data record comprising a plaintext; and computer readable program code configured to apply the ranking function of the complex format to the plaintext;

computer readable program code configured to hash a result of applying the ranking function of the complex format to the plaintext; and computer readable program code configured to apply the unranking function of the complex format to the hashing of the result, thereby generating a non-reversible token.

16. The computer program product according to claim 15, wherein the one or more combining operations are selected from a list consisting of concatenating indicated format definitions and generating a union of indicated format definitions, and wherein the computer readable program code is configured to transmit the token to a remote computer.

17. The computer program product according to claim 15, wherein the computer readable program code is configured to storing, in the memory, a format definition of the complex format, and the ranking and unranking functions of the complex format.

18. The computer program product according to claim 17, wherein the computer readable program code is configured to receive indications defining a complex format formed of one or more of the multiple primitives and one or more of the complex formats having a record stored in the memory and, and to define an additional complex format based on a combination of the one or more of the multiple primitives and the one or more complex formats having a record stored in the memory.

19. The computer program product according to claim 15, wherein the computer readable program code is configured to generate the token by initializing a message space with multiple entries, each entry having a corresponding index, to map, using the complex format, the plaintext to a first given index, to apply a hashing algorithm to tokenize the first given index to a second given index, and to retrieve, from the message space, a given entry having the second given index.

20. The computer program product according to claim 19, wherein the plaintext comprises a first plaintext, and wherein the given entry comprises a first given entry, and wherein subsequent to tokenizing the first given index to the second given index, the computer readable program code is configured to map a second plaintext to a third given index, and upon applying the hashing algorithm in order to tokenize the third given index to the second given index, to apply the hashing algorithm to the second given index in order to tokenize the second given index to a fourth given index, and to retrieve, from the message space, a second given entry having the fourth given index.

\* \* \* \* \*